(12) United States Patent
Kawanishi et al.

(10) Patent No.: US 12,523,288 B2
(45) Date of Patent: Jan. 13, 2026

(54) POWER TRANSMISSION DEVICE

(71) Applicant: TOYOTA JIDOSHA KABUSHIKI KAISHA, Toyota (JP)

(72) Inventors: Hiroshi Kawanishi, Nisshin (JP); Akitaka Ichikawa, Nisshin (JP); Marina Hirata, Toyota (JP); Shohei Nagata, Nisshin (JP); Tsukasa Sakamaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/503,654

(22) Filed: Nov. 7, 2023

(65) Prior Publication Data
US 2024/0167558 A1 May 23, 2024

(30) Foreign Application Priority Data

Nov. 18, 2022 (JP) .................. 2022-184983

(51) Int. Cl.
*F16H 57/04* (2010.01)
*F16H 57/02* (2012.01)
*F16H 57/021* (2012.01)

(52) U.S. Cl.
CPC ..... *F16H 57/0424* (2013.01); *F16H 57/0423* (2013.01); *F16H 57/0457* (2013.01); *F16H 57/021* (2013.01); *F16H 57/045* (2013.01)

(58) Field of Classification Search
CPC ........ F16H 1/22; F16H 57/021; F16H 57/023; F16H 57/03; F16H 57/0421;
(Continued)

(56) References Cited

U.S. PATENT DOCUMENTS 2,214,485 A * 9/1940 Short .................. F16H 57/0493
184/6.12
2,645,305 A * 7/1953 Roos .................... F16H 57/0427
184/11.1
(Continued)

FOREIGN PATENT DOCUMENTS

CN 111425586 A * 7/2020 ......... F16H 57/0413
DE 102010047515 A1 * 5/2011 ............... F16N 7/36
(Continued)

OTHER PUBLICATIONS

Machine translation of DE 102016214592 A1 obtained on Apr. 10, 2025.*

*Primary Examiner* — Adam D Rogers
(74) *Attorney, Agent, or Firm* — Sughrue Mion, PLLC (57) ABSTRACT

A power transmission device may include a casing; and a plurality of gears located in the casing and being lubricated by a lubricant in the casing, wherein the plurality of gears may include a first gear that upwardly displaces the lubricant accumulating at a lower portion in the casing by rotation of the first gear; the casing may include a facing wall facing a side surface of the first gear; the facing wall may include a first rib that protrudes toward the side surface of the first gear and extends along a circumferential direction of the first gear; and the side surface of the first gear, the first rib, and the facing wall may define a first lubricant passage that guides the lubricant displaced upward by the first gear along the circumferential direction.

3 Claims, 6 Drawing Sheets

(58) Field of Classification Search
CPC ............ F16H 57/0423; F16H 57/0424; F16H 57/045; F16H 57/0457
See application file for complete search history.

(56) References Cited

U.S. PATENT DOCUMENTS

| | | | | |
|---|---|---|---|---|
| 2,910,142 | A * | 10/1959 | Almen | F16H 57/0434 184/6.12 |
| 4,470,324 | A * | 9/1984 | Renk | F16H 57/0423 74/606 R |
| 5,676,221 | A * | 10/1997 | Renk | F16N 7/28 74/609 |
| 8,931,596 | B2 * | 1/2015 | Shioiri | F16H 57/0423 184/6.12 |
| 9,945,471 | B2 * | 4/2018 | Itoo | F16H 57/0441 |
| 10,746,282 | B2 * | 8/2020 | Ito | F16H 57/0471 |
| 11,306,814 | B2 * | 4/2022 | Leloup | F16H 48/38 |
| 11,796,049 | B2 * | 10/2023 | Jeong | B60K 17/043 |
| 11,994,201 | B2 * | 5/2024 | Tsuchida | F16H 57/0457 |
| 12,049,952 | B2 * | 7/2024 | Tamura | F16H 57/045 |

FOREIGN PATENT DOCUMENTS

| | | | | |
|---|---|---|---|---|
| DE | 102016214592 | A1 * | 2/2018 | |
| DE | 102017000304 | B3 * | 5/2018 | ......... F16H 57/0447 |
| EP | 3660354 | A1 | 6/2020 | |
| JP | 7-158723 | A | 6/1995 | |
| JP | 2003-336729 | A | 11/2003 | |
| JP | 2018-28352 | A | 2/2018 | |
| JP | 2020-85145 | A | 6/2020 | |

* cited by examiner

POWER TRANSMISSION DEVICE

REFERENCE TO RELATED APPLICATIONS

This application claims priority from Japanese Patent Application No. 2022-184983 filed on Nov. 18, 2022. The entire content of the priority application is incorporated herein by reference.

BACKGROUND ART

The technique disclosed herein relates to a power transmission device for a vehicle.

Japanese Patent Application Publication H7-158723 describes a power transmission device for a vehicle. In this power transmission device, a predetermined gear (hereinafter, referred to as a first gear) rotates to upwardly displace lubricant accumulated at a lower portion in a casing.

DESCRIPTION

In the above-described power transmission device, a scattering path of the lubricant changes in accordance with a rotational speed of the first gear that upwardly displaces the lubricant. Therefore, depending on the rotational speed of the first gear, the lubricant may not be stably supplied to the first gear itself or a bearing portion supporting the first gear, for example. The present disclosure may at least partially solve such a problem.

The technique disclosed herein is embodied as a power transmission device for a vehicle. In the first aspect, the power transmission device may comprise a casing; and a plurality of gears located in the casing and being lubricated by a lubricant in the casing. The plurality of gears may comprise a first gear that upwardly displaces the lubricant accumulating at a lower portion in the casing by rotation of the first gear. The casing may comprise a facing wall facing a side surface of the first gear. The facing wall may comprise a first rib that protrudes toward the side surface of the first gear and extend along a circumferential direction of the first gear. The side surface of the first gear, the first rib, and the facing wall may define a first lubricant passage that guides the lubricant displaced upward by the first gear along the circumferential direction.

In the above-described power transmission device, the first rib is provided on the facing wall which faces the side surface of the first gear. The first rib, along with the side surface of the first gear and the facing wall, defines the first lubricant passage that guides the lubricant in the circumferential direction. According to such a configuration, regardless of a rotational speed of the first gear, a part of the lubricant displaced upward by the rotation of the first gear is guided along the predetermined first lubricant passage. Thus, regardless of the rotational speed of the first gear, the lubricant can be stably supplied to, for example, the first gear itself or a bearing portion supporting the first gear.

EMBODIMENTS

In the following, configurations of the technology disclosed in the present disclosure are listed, following the first aspect.

In the second aspect, in the first aspect described above, the facing wall may further comprise a second rib that protrudes toward the side surface of the first gear and extends parallel to the first rib. In this case, the second rib may be located inward of the first rib when viewed from a rotation axis of the first gear. According to such a configuration, the aforementioned first lubricant passage is defined between the first rib and the second rib which are parallel to each other. When the rotational speed of the first gear is relatively high, the lubricant displaced upward by the first gear is guided along the first lubricant passage by the first rib. When the rotational speed of the first gear is relatively low, the lubricant displaced upward by the first gear is guided along the first lubricant passage by the second rib. In this way, regardless of the rotational speed of the first gear, a part of the lubricant displaced upward by the rotation of the first gear can be guided more reliably along the predetermined first lubricant passage.

In the third aspect, in the second aspect described above, a flow out guide may be provided at the first lubricant passage, and a cross-sectional area of the first lubricant passage may be locally changed at the flow out guide. According to such a configuration, the flow of the lubricant in the first lubricant passage can be intentionally stagnated at the flow out guide. This makes it possible to allow the lubricant flowing along the first lubricant passage to flow out of the first lubricant passage at the flow out guide and guide the same to a desired location.

In the fourth aspect, in the third aspect described above, the flow out guide may be located vertically above the rotation axis of the first gear. According to such a configuration, the lubricant can be effectively guided, for example, to a bearing portion located immediately below the flow out guide for the lubricant.

In the fifth aspect, in the third or fourth aspect described above, the facing wall may further comprise a second lubricant passage branching from the flow out guide toward an interior of the facing wall. According to such a configuration, the lubricant flowing along the first lubricant passage can be guided to another portion to be lubricated through the second lubricant passage. In this case, a tubular member for guiding the lubricant may be further connected to the second lubricant passage.

First Embodiment

Figure 1:
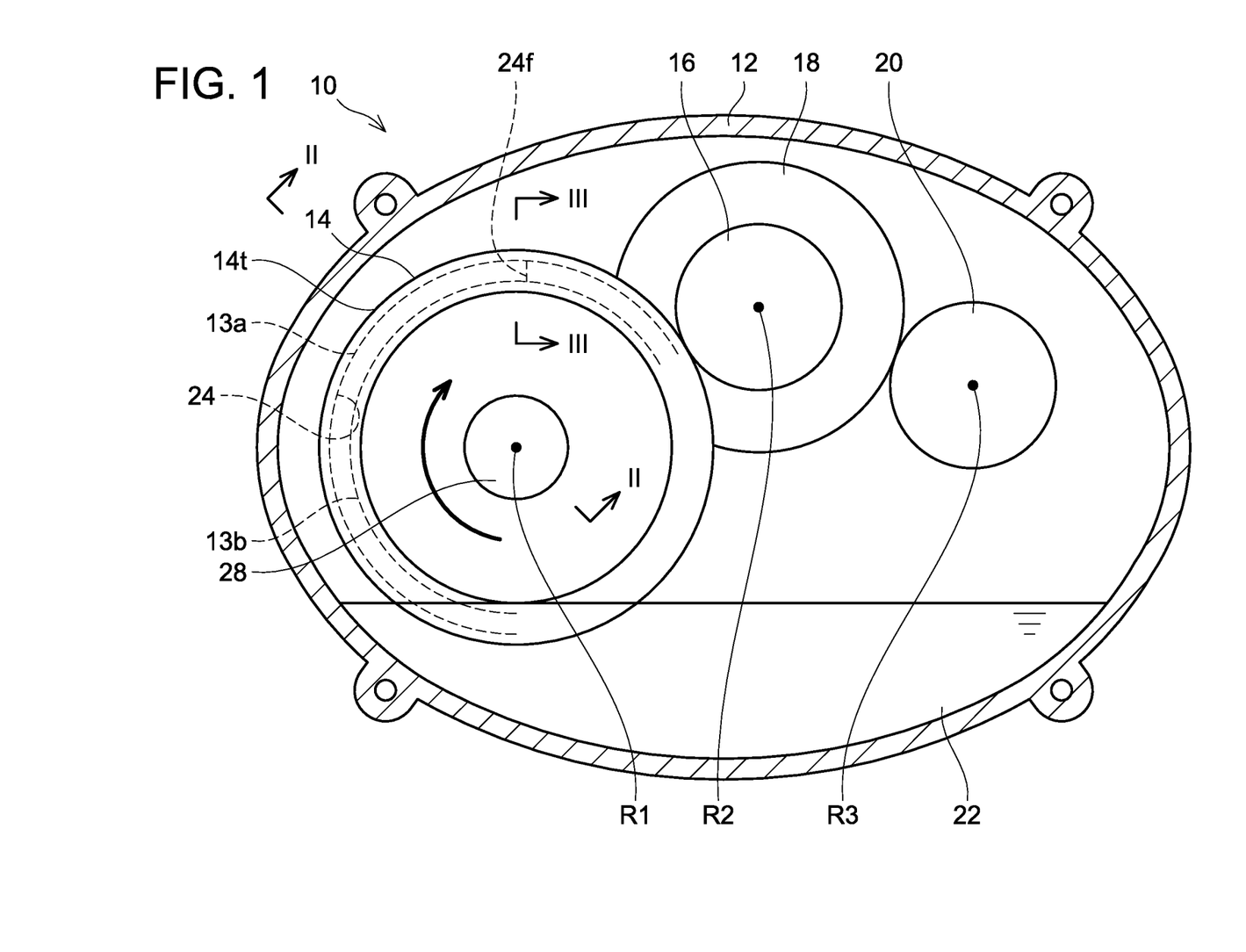
FIG. 1 is a view schematically showing a configuration of a power transmission device according to a first embodiment.
Figure 2:
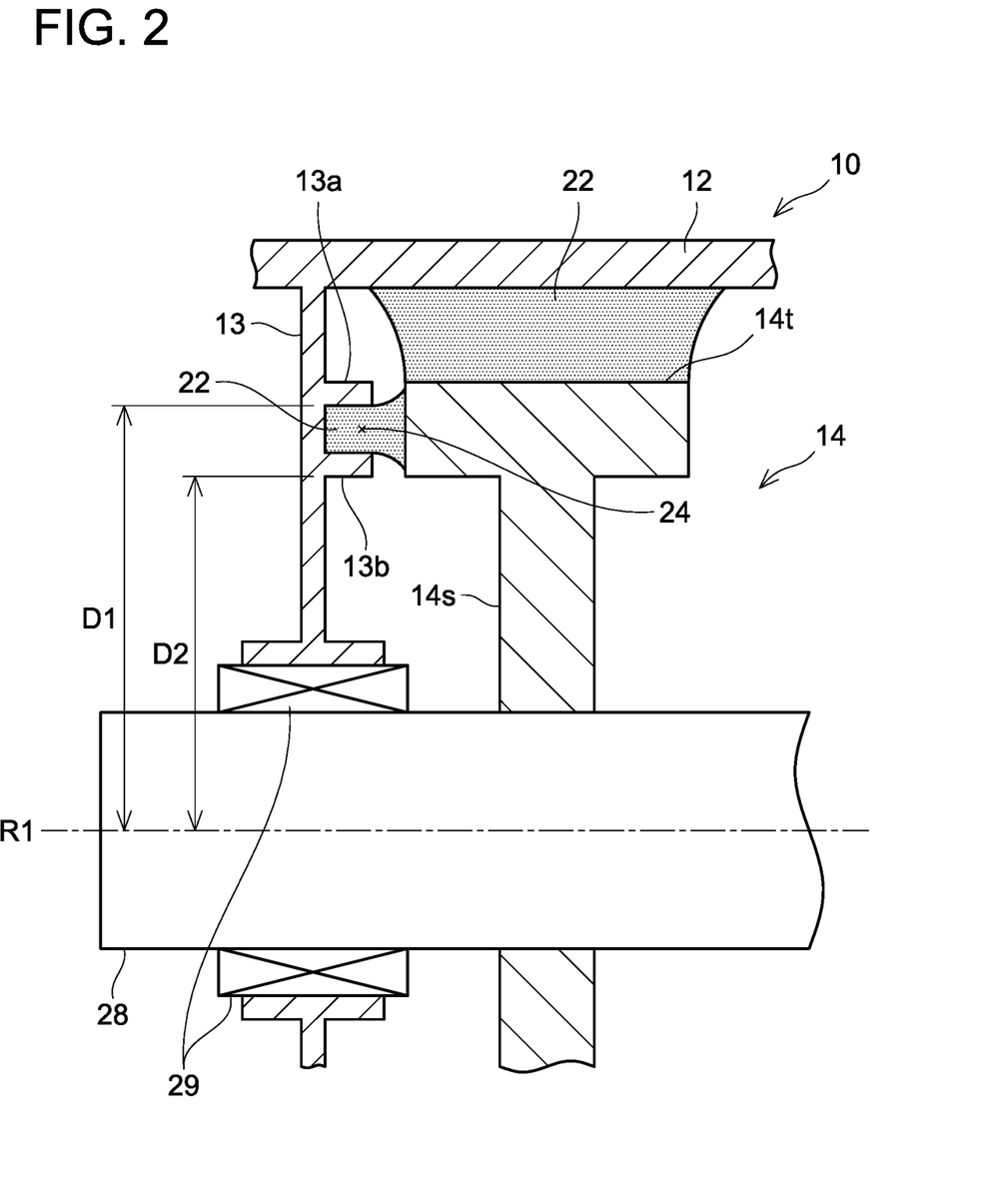
FIG. 2 is a view taken along a II-II line of FIG. 1 and showing a first lubricant passage.
Figure 3:
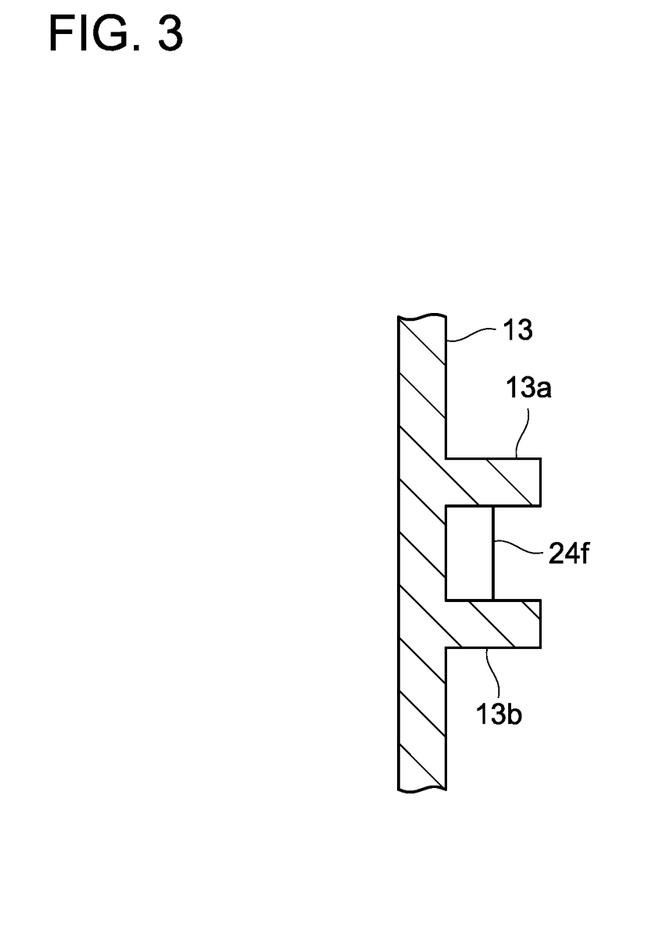
FIG. 3 is a view taken along a III-III line of FIG. 1 and showing a flow out guide provided at the first lubricant passage.

Referring to FIG. 1-3, a power transmission device 10 of a first embodiment will be described. The power transmission device 10 is mounted on a vehicle and configured to transmit power from an engine and/or a traction motor to wheels. As shown in FIG. 1, the power transmission device 10 includes a casing 12 and a plurality of gears 14, 16, 18, 20. The plurality of gears 14, 16, 18, 20 is configured to amplify and transmit the torque of the engine and/or the traction motor to the wheels of the vehicle. The plurality of gears 14, 16, 18, 20 is located within the casing 12. Each of the plurality of gears 14, 16, 18, 20 is rotatably supported within the casing 12. Lubricant 22 is accumulated at a lower portion in the casing 12. The plurality of gears 14, 16, 18, 20 is lubricated by the lubricant 22 in the casing 12. The lubricant 22 is, for example, automatic transmission fluid (ATF).

The plurality of gears 14, 16, 18, 20 includes a first gear 14, a second gear 16, a third gear 18, and a fourth gear 20. The first gear 14 rotates about a first rotation axis R1. A portion of the first gear 14 is immersed in the lubricant 22 that accumulates at the lower portion in the casing 12. The first gear 14 displaces the lubricant 22 by its rotation. The first gear 14 constitutes a part of a differential gear, for example. The second gear 16 rotates about a second rotation axis R2. The second rotation axis R2 extends parallel to the first rotation axis R1. The second gear 16 is arranged to mesh with the first gear 14. The third gear 18 is located coaxially with the second gear 16 and rotates about the second rotation axis R2. The third gear 18 has a larger diameter dimension than the second gear 16. The fourth gear 20 rotates about a third rotation axis R3. The third rotation axis R3 extends parallel to the second rotation axis R2. The fourth gear 20 is arranged to mesh with the third gear 18. The fourth gear 20 is connected to the engine and/or the traction motor of the vehicle and is rotationally driven by the engine and/or the traction motor.

Here, a detailed configuration of the first gear 14 will be described. As shown in FIGS. 1 and 2, the first gear 14 is generally disc-shaped and includes an outer peripheral surface 14t and a pair of side surfaces 14s. The first gear 14 is an external teeth gear including a plurality of teeth on the outer peripheral surface 14t. The plurality of teeth is arranged along the circumferential direction of the first gear 14 on the outer peripheral surface 14t of the first gear 14. The specific shape of the plurality of teeth is not particularly limited. The first gear 14 may be, for example, a helical gear, a spur gear, or a double helical gear. The first gear 14 is fixed to the shaft 28. The shaft 28 extends along the first rotation axis R1. The shaft 28 is fixed to the casing 12 via a bearing 29.

The configuration of the casing 12 will be described. The casing 12 includes a facing wall 13 facing one of the side surfaces 14s of the first gear 14. The facing wall 13 extends along the side surfaces 14s of the first gear 14 to the bearing 29 of the shaft 28. The bearing 29 is fixed to the facing wall 13 and the shaft 28 extends through the facing wall 13. The facing wall 13 includes a first rib 13a and a second rib 13b. The first rib 13a and the second rib 13b protrude toward one of the side surfaces 14s of the first gear 14. The First rib 13a and the second rib 13b extend along the circumferential direction of the first gear 14. The second rib 13b extends in parallel with the first rib 13a. The second rib 13b is located inward of the first rib 13a when viewed from the first rotation axis R1 of the first gear 14. That is, a distance D2 from the first rotation axis R1 to the second rib 13b is shorter than a distance D1 from the first rotation axis R1 to the first rib 13a. Although this is an example, the first rib 13a and the second rib 13b are adjacent to the outer peripheral surface 14t of the first gear 14.

The first rib 13a and the second rib 13b define a first lubricant passage 24. Specifically, this first lubricant passage 24 is defined by one of the side surfaces 14s of the first gear 14, the first rib 13a and the second rib 13b, and the facing wall 13. The first lubricant passage 24 guides the lubricant 22 displaced upward by the first gear 14 rotating along the circumferential direction of the first gear 14. According to such a configuration, regardless of the rotational speed of the first gear 14, a part of the lubricant 22 displaced upward by the rotation of the first gear 14 is guided along the predetermined first lubricant passage 24. Thus, regardless of the rotational speed of the first gear 14, the lubricant 22 can be stably supplied to, for example, the first gear 14 itself or the bearing 29 supporting the first gear 14.

Here, two of the first rib 13a and the second rib 13b are not necessarily required to define the first lubricant passage 24. That is, when at least the first rib 13a is provided, one of the side surfaces 14s of the first gear 14, the first rib 13a and the facing wall 13 can define the first lubricant passage 24. However, when two of the first rib 13a and the second rib 13b are present and the first lubricant passage 24 is defined between those ribs 13a, 13b, the lubricant 22 can be guided more reliably along the first lubricant passage 24. For example, when the rotational speed of the first gear 14 is relatively high, the lubricant 22 displaced upward by the first gear 14 is guided along the first lubricant passage 24 by the first rib 13a. On the other hand, when the rotational speed of the first gear 14 is relatively low, the lubricant 22 displaced upward by the first gear 14 is guided along the first lubricant passage 24 by the second rib 13b.

As shown in FIGS. 1 and 3, a flow out guide 24f is provided at the first lubricant passage 24. At the flow out guide 24f, the cross-sectional area of the first lubricant passage 24 is locally changed. According to such a configuration, the flow of the lubricant 22 in the first lubricant passage 24 can be intentionally stagnated at the flow out guide 24f. This makes it possible to allow the lubricant 22 flowing along the first lubricant passage 24 to flow out of the first lubricant passage 24 at the flow out guide 24f and guide the same to a desired location. Therefore, as in the present embodiment, when the flow out guide 24f is located vertically above the first rotation axis R1 of the first gear 14, the lubricant 22 can be effectively guided to the bearing 29 located immediately below the flow out guide 24f for the lubricant 22.

The specific position and shape of the flow out guide 24f are not particularly limited, and it only needs to be formed such that the cross-sectional area of the first lubricant passage 24 locally changes. This is only an example, however, the flow out guide 24f is provided, for example, at the facing wall 13 between the first rib 13a and the second rib 13b. However, a position of the flow out guide 24f is not limited to the above-described position, and the flow out guide 24f may be provided at at least one of the first rib 13a and the second rib 13b. In addition, the flow out guide 24f is formed by an uneven shape such as a ridge provided on the facing wall 13. However, the uneven shape forming the flow out guide 24f is not limited to the ridge, and may be a recess, a groove, or a hole.

Second Embodiment

Figure 4:
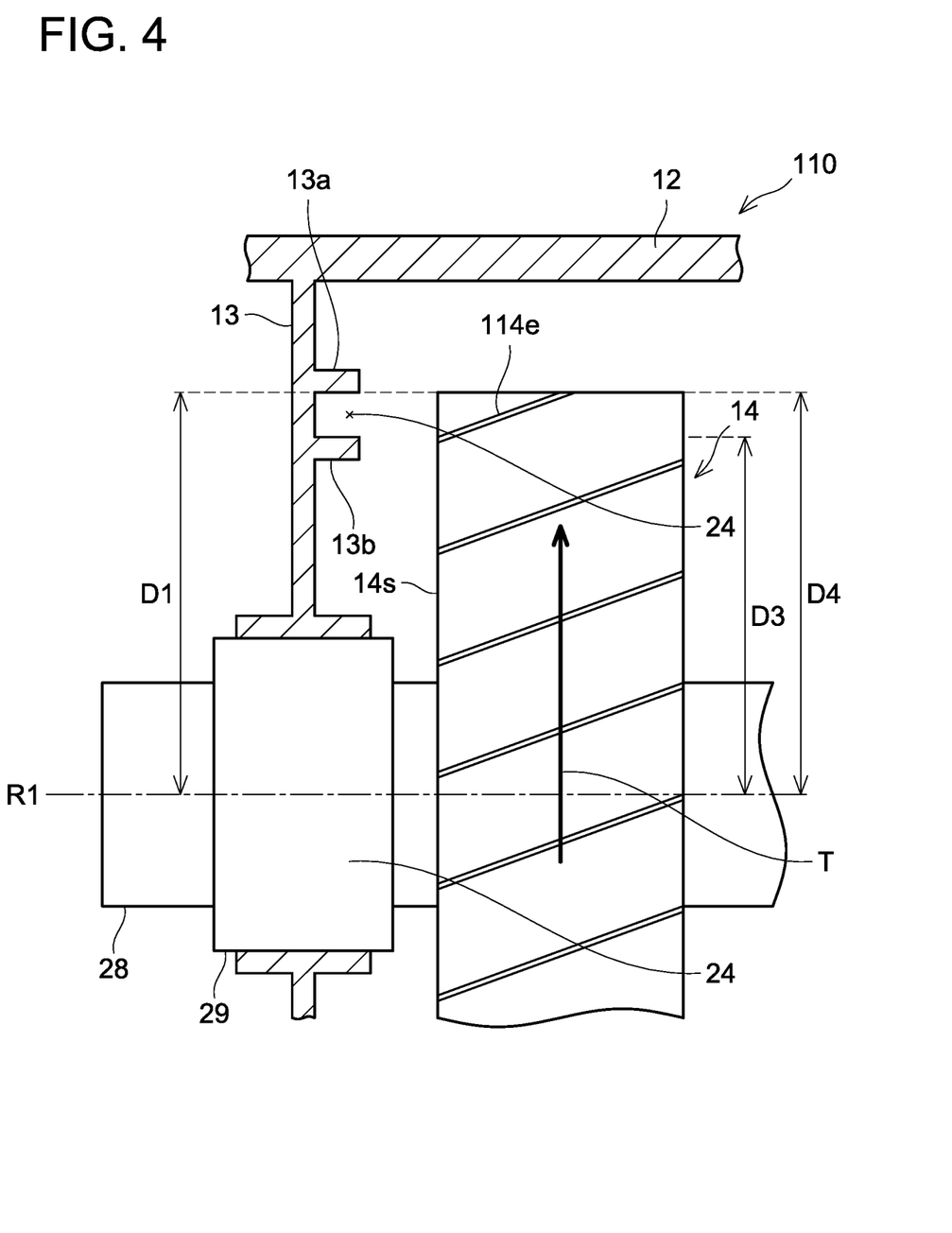
FIG. 4 is a view showing a configuration of a power transmission device according to a second embodiment. Here, only a casing is shown in a cross section.

Referring to FIG. 4, a power transmission device 110 of a second embodiment will be described. In the power transmission device 110 of the second embodiment, the configuration of the first gear 14 is changed as compared with the power transmission device 10 of the first embodiment. Hereinafter, differences from the power transmission device 10 of the first embodiment will be mainly described, and the redundant explanation for the remaining points will be omitted.

As shown in FIG. 4, the first gear 14 in the second embodiment is a helical gear. That is, tooth edges 114e of the first gear 14 are not parallel to the first rotation axis R1, but is inclined toward the facing wall 13 with respect to a rotational direction T of the first gear 14. A radius D3 of an addendum circle of the first gear 14 is equal to or larger than the distance D1 from the first rotation axis R1 to the first rib 13a. On the other hand, a radius D4 of a dedendum circle of the first gear 14 is smaller than D1 from the first rotation axis R1 to the first rib 13a.

In the above-described configuration, since the first gear 14 is a helical gear, an plurality of inclined teeth of the first gear 14 scatters the lubricant 22 toward the facing wall 13. At this time, since the first lubricant passage 24 at the facing wall 13 is adjacent to the plurality of teeth of the first gear 14, the lubricant 22 scattered from the first gear 14 is received by the first lubricant passage 24. Consequently, a part of the lubricant 22 displaced upward by the rotation of the first gear 14 can be guided more reliably along the predetermined first lubricant passage 24, regardless of the rotation speed of the first gear 14.

Third Embodiment

Figure 5:
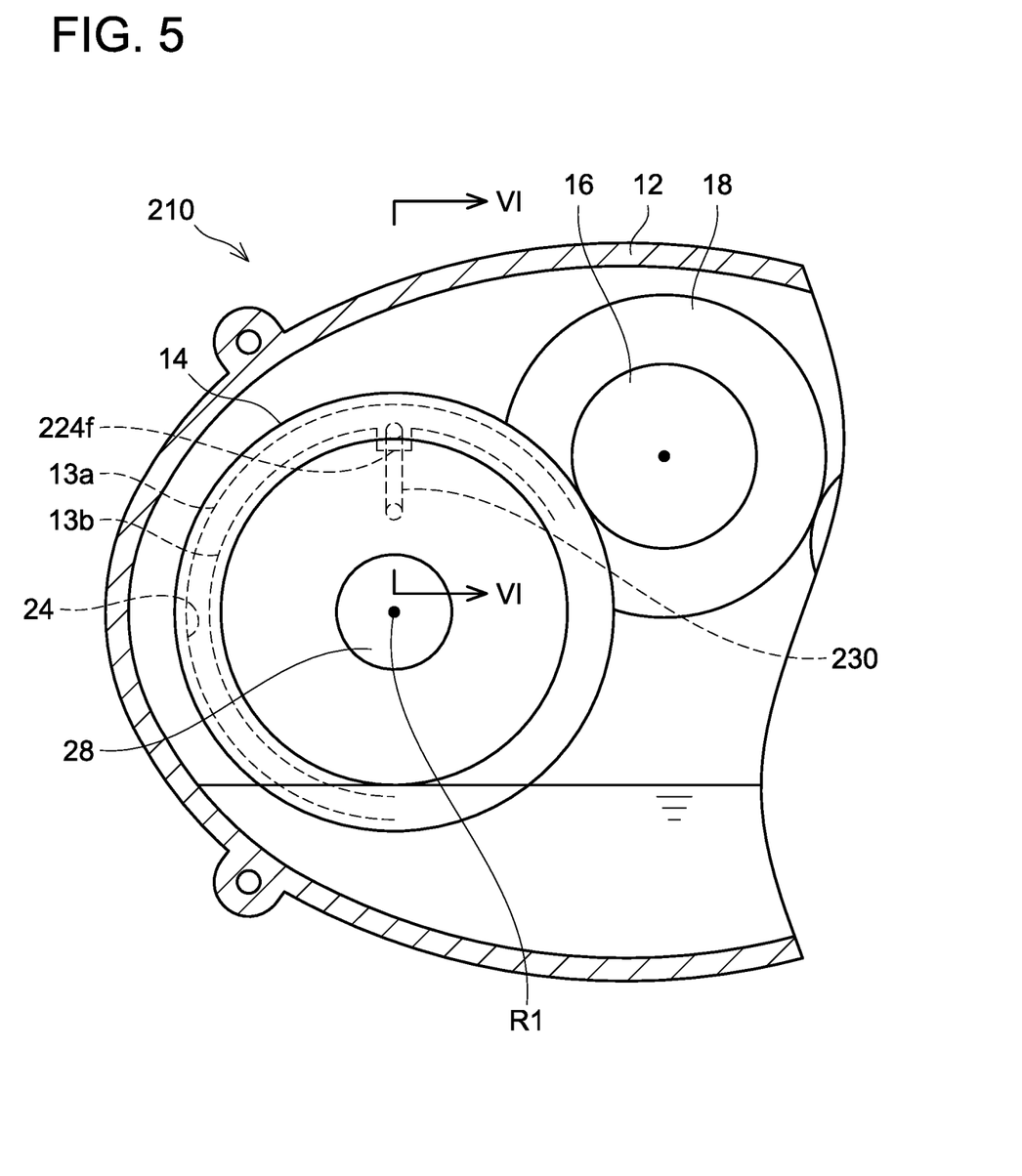
FIG. 5 is a view schematically showing a configuration of a power transmission device according to a third embodiment.
Figure 6:
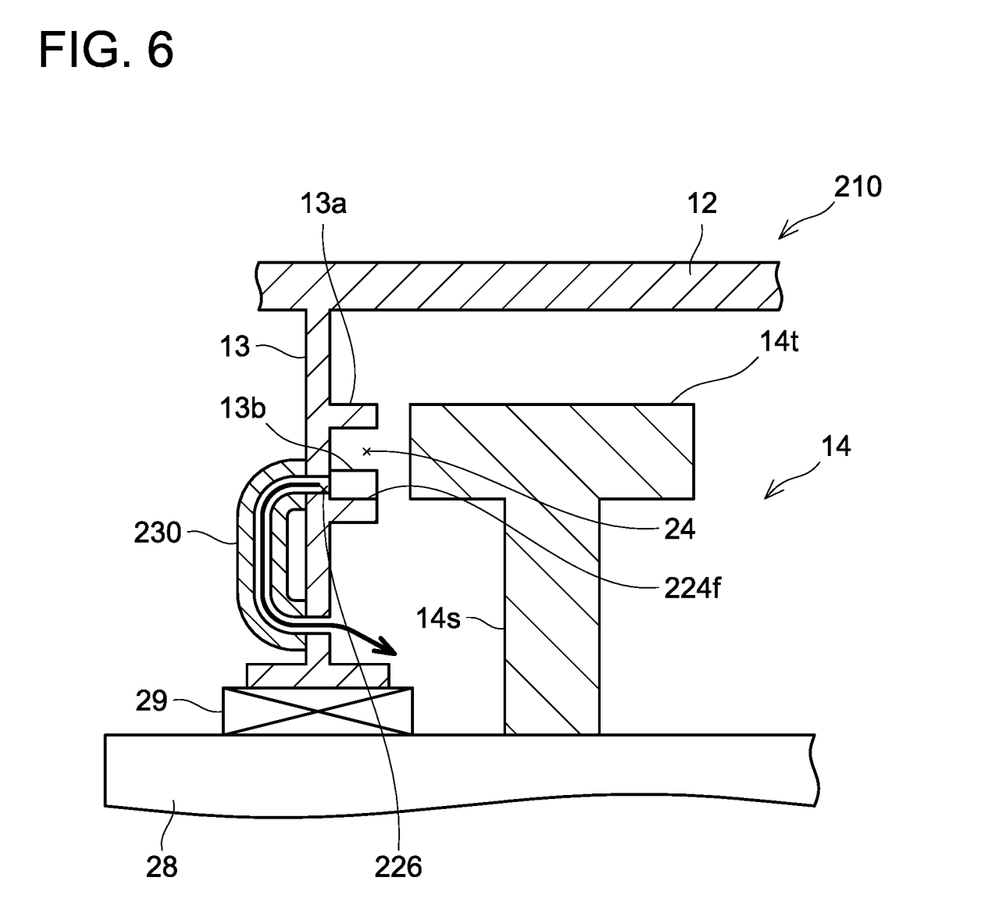
FIG. 6 is a view taken along a VI-VI line of FIG. 5 and showing configurations of a first lubricant passage and a second lubricant passage according to the third embodiment.

Referring to FIGS. 5 and 6, a power transmission device 210 of a third embodiment will be described. As shown in FIGS. 5 and 6, in the power transmission device 210 of the third embodiment, a configuration of a flow out guide 24f of the first lubricant passage 24 is changed as compared with the power the transmission device 10 of the first embodiment. In addition, in the third embodiment, the facing wall 13 of the casing 12 includes not only the first lubricant passage 24 but also a second lubricant passage 226. In the above-described points, the power transmission device 210 of the third embodiment differs from the power transmission device 10 of the first embodiment. Hereinafter, differences from the power transmission device 10 of the first embodiment will be mainly described, and the redundant explanation for the remaining points will be omitted.

At the first lubricant passage 24, for example, a flow out guide 224f is provided vertically above the first rotation axis R1. At the flow out guide 224f, the cross-sectional area of the first lubricant passage 24 changes locally. Specifically, a recess is provided in the second rib 13b, and the flow out guide 224f is provided by the recess provided in the second rib 13b. According to such a configuration, the flow of the lubricant 22 in the first lubricant passage 24 can be intentionally stagnated at the flow out guide 224f. This makes it possible to allow the lubricant 22 flowing along the first lubricant passage 24 to flow out of the first lubricant passage 24 at the flow out guide 24f.

Further, as described above, the facing wall 13 of the casing 12 further comprises the second lubricant passage 226 in addition to the first lubricant passage 24. The second lubricant passage 226 has, for example, a hole-shape and is provided such that the second lubricant passage 26 passes through the facing wall 13. The second lubricant passage 226 branches from the flow out guide 224f and extends through the interior of the facing wall 13. According to such a configuration, it is possible to guide the lubricant 22 which has flown out of the flow out guide 224f of the first lubricant passage 24 to the bearing 29 of the first gear 14 located immediately below the flow out guide 224f through the second lubricant passage 226.

Although this is an example, a tubular member 230 is connected to the second lubricant passage 226. The tubular member 230 extends from the second lubricant passage 226 toward the bearing 29 of the first gear 14 located immediately below the second lubricant passage 226. By using such a tubular member 230, the lubricant 22 can be guided more reliably from the second lubricant passage 226 to the bearing 29 of the first gear 14.

What is claimed is:

1. A power transmission device for a vehicle, comprising:
a casing; and
a plurality of gears located in the casing and being lubricated by a lubricant in the casing,
wherein the plurality of gears comprises a first gear that upwardly displaces the lubricant accumulating at a lower portion in the casing by rotation of the first gear;
the casing comprises a facing wall facing a side surface of the first gear;
the facing wall comprises a first rib that protrudes toward the side surface of the first gear and extends along a circumferential direction of the first gear; and
the side surface of the first gear, the first rib, and the facing wall define a first lubricant passage that guides the lubricant displaced upward by the first gear along the circumferential direction,
wherein
the facing wall further comprises a second rib that protrudes toward the side surface of the first gear and extends parallel to the first rib,
the second rib is located inward of the first rib when viewed from a rotation axis of the first gear,
a flow out guide is provided at the first lubricant passage, and
a cross-sectional area of the first lubricant passage is locally changed at the flow out guide.

2. The power transmission device according to claim 1, wherein
the flow out guide is located vertically above the rotation axis of the first gear.

3. The power transmission device according to claim 2, wherein
the facing wall further comprises a second lubricant passage branching from the flow out guide toward an interior of the facing wall.

* * * * *